(12) United States Patent
Ding

(10) Patent No.: US 11,836,052 B2
(45) Date of Patent: Dec. 5, 2023

(54) DATA BACKUP AND RECOVERY MANAGEMENT USING ALLOCATED DATA BLOCKS

(71) Applicant: Rubrik, Inc., Palo Alto, CA (US)

(72) Inventor: Li Ding, Cupertino, CA (US)

(73) Assignee: Rubrik, Inc., Palo Alto, CA (US)

( * ) Notice: Subject to any disclaimer, the term of this patent is extended or adjusted under 35 U.S.C. 154(b) by 197 days.

(21) Appl. No.: 17/443,618

(22) Filed: Jul. 27, 2021

(65) Prior Publication Data

US 2023/0035929 A1    Feb. 2, 2023

(51) Int. Cl.
    *G06F 9/54*     (2006.01)
    *G06F 11/14*    (2006.01)
    *G06F 9/455*    (2018.01)

(52) U.S. Cl.
    CPC ...... *G06F 11/1469* (2013.01); *G06F 9/45558* (2013.01); *G06F 9/544* (2013.01); *G06F 2009/45583* (2013.01); *G06F 2201/84* (2013.01)

(58) Field of Classification Search
    CPC ... G06F 9/544; G06F 11/1469; G06F 9/45558
    See application file for complete search history.

(56) References Cited

U.S. PATENT DOCUMENTS

| | | | | |
|---|---|---|---|---|
| 8,443,166 B2* | 5/2013 | Czezatke | ............... | G06F 12/10 711/204 |
| 8,799,618 B2* | 8/2014 | Cilibrasi | ............... | G06F 12/023 711/202 |
| 8,856,078 B2* | 10/2014 | Knowles | ............... | G06F 3/0673 707/649 |
| 9,396,004 B1* | 7/2016 | Bester | ................. | G06F 9/45533 |
| 9,430,272 B2* | 8/2016 | Bezbaruah | .......... | G06F 11/1451 |
| 9,514,002 B2* | 12/2016 | Christopher | ........ | G06F 11/1458 |
| 9,547,555 B2* | 1/2017 | Starks | ................. | G06F 11/1048 |
| 9,710,386 B1* | 7/2017 | Zhang | .................. | G06F 9/5016 |
| 9,727,426 B2* | 8/2017 | Starks | ................. | G06F 11/1471 |
| 9,772,907 B2* | 9/2017 | Christopher | ........ | G06F 11/1451 |
| 9,800,569 B2* | 10/2017 | Edwards, Jr. | ........ | G06F 11/1458 |
| 9,836,340 B2* | 12/2017 | Bello | .................. | G06F 11/0727 |
| 9,851,918 B2* | 12/2017 | Tsirkin | ................. | G06F 3/0647 |
| 10,001,933 B1* | 6/2018 | Johnson | ............... | G06F 3/0665 |
| 10,496,431 B2* | 12/2019 | Aravot | ................. | G06F 3/0647 |
| 10,929,238 B2* | 2/2021 | Horowitz | ............ | G06F 11/1458 |
| 11,073,986 B2* | 7/2021 | Krause | ................ | G06F 12/1009 |
| 11,221,768 B2* | 1/2022 | Koester | .................. | G06F 3/067 |
| 2010/0106691 A1* | 4/2010 | Preslan | ............... | G06F 11/1453 707/674 |
| 2011/0082972 A1* | 4/2011 | Cherkasova | ........ | G06F 11/1461 711/111 |

(Continued)

*Primary Examiner* — Eliyah S. Harper
(74) *Attorney, Agent, or Firm* — Holland & Hart LLP

(57) ABSTRACT

A data backup and recovery method and system using allocated data blocks include identifying a first snapshot associated with a virtual machine; accessing changed block tracking data associated with data changes occurred in the virtual machine, the data changes corresponding to a set of changed data blocks; accessing block allocation status data associated with the set of changed data blocks; identifying one or more allocated data blocks from the set of changed data blocks that are associated with allocated status based on the block allocation status data; and storing the one or more allocated data blocks to a storage device.

20 Claims, 9 Drawing Sheets

(56) References Cited

U.S. PATENT DOCUMENTS

| | | | |
|---|---|---|---|
| 2012/0084517 A1* | 4/2012 | Post | G06F 9/45541 |
| | | | 711/E12.001 |
| 2014/0149984 A1* | 5/2014 | Takahashi | G06F 9/4856 |
| | | | 718/1 |
| 2018/0039434 A1* | 2/2018 | Balcha | G06F 3/0665 |
| 2021/0191629 A1* | 6/2021 | Vibhor | G06F 3/0659 |

* cited by examiner

| CBT | Allocated | Need to ingest |
|-----|-----------|----------------|
| Yes | Yes | Yes |
| Yes | No | No |
| No | Yes | No |
| No | No | No |

FIG. 7

DATA BACKUP AND RECOVERY MANAGEMENT USING ALLOCATED DATA BLOCKS

BACKGROUND

The volume and complexity of data that is collected, analyzed, and stored are increasing rapidly over time. The computer infrastructure used to handle this data is also becoming more complex, requiring increased data processing power and portability. As a result, data management and storage are becoming increasingly important. Significant issues include latency when processing a large volume of data during processes such as data ingestion, storage, export, and recovery.

BRIEF DESCRIPTION OF THE SEVERAL VIEWS OF THE DRAWINGS

Some embodiments are illustrated by way of example and not limited to the views of the accompanying drawing:

FIG. 7 depicts an example truth table implemented by an example data management system for data backup and recovery during operation, according to some embodiments.

DETAILED DESCRIPTION

The description that follows includes systems, methods, techniques, instruction sequences, and computing machine program products that embody illustrative embodiments of the present disclosure. In the following description, for purposes of explanation, numerous specific details are set forth in order to provide a thorough understanding of example embodiments. It will be evident, however, to one skilled in the art that the present inventive subject matter may be practiced without these specific details.

It will be appreciated that some of the examples disclosed herein are described in the context of virtual machines that are backed up by using base snapshots and incremental snapshots, for example. They should not necessarily be regarded as limitations of the disclosures. The disclosures, systems and methods described herein apply not only to virtual machines of all types that run a file system, but also to network-attached storage (NAS) devices, physical machines, and databases.

Existing data management systems ingest (e.g., read), store, and export a large volume of data for data backup and recovery purposes. Data transfer and processing in large volumes may cause significant workload latency and slow down system responses, negatively affecting system performance and user experience.

Various embodiments described herein relate to a data management system for data backup and recovery (or restore) that improves system performance by reducing workload latency. Specifically, in some examples, the data management system increases the speed of data read and write and reduces the amount of data needed for the data read and write. In various embodiments, after a snapshot (e.g., first snapshot) is taken for a particular virtual machine at a given timestamp (e.g., the first point in time), the data management system may request to receive (or access) changed block tracking (CBT) data associated with the data changes occurred in the machine up to the time of the request (e.g., the second point in time), specifically, the data changes occurred on the virtual disks associated with the particular virtual machine. The CBT data represents a set of data blocks (e.g., a set of changed data blocks) that have changed on the virtual disks between the first point in time and the subsequent second point in time. In various embodiments, the CBT data may include data blocks associated with block allocation status, represented by block allocation status data. Specifically, if the virtual disks are associated with thin provision virtual disk format or thick provision lazy zeroed virtual disk format, certain blocks may be marked (or flagged) as allocated (e.g., usable or non-deleted), whereas other blocks may be marked as unallocated (e.g., unusable or deleted). Unallocated blocks may be data that have been deleted, based either on a request from a user or from the system itself. Data blocks and blocks are used interchangeably in the present disclosure.

Figure 6:
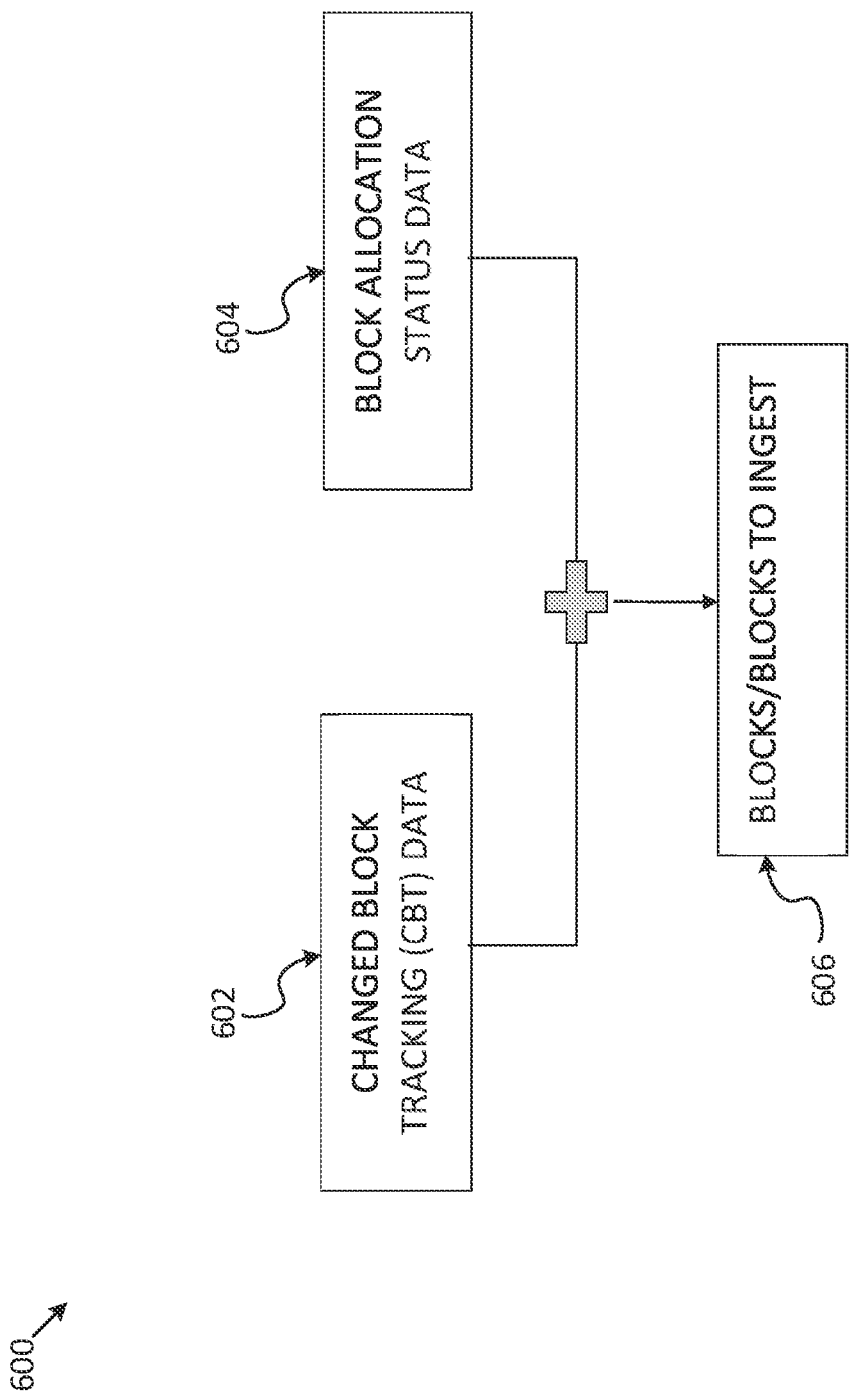
FIG. 6 depicts a flowchart illustrating data flow within an example data management system for data backup and recovery during operation, according to some embodiments.

In various embodiments, among the set of blocks identified based on the CBT data, the data management system may identify one or more data blocks that are allocated (e.g., associated with block allocation status indicating "allocated") and only ingest/read both changed and allocated data blocks, such as blocks 606 as illustrated in FIG. 6, to the storage appliance. Under this approach, the data management system may avoid ingesting unchanged data blocks, or changed data blocks that have already been deleted (e.g., unallocated) to the storage appliance for downstream data backup and recovery operations. Therefore, this approach may help significantly reduce inbound (e.g., data ingestion) and outbound (e.g., data export) network traffic, save storage space, reduce data backup time, and improve system performance for data export and recovery.

In various embodiments, the data management system may generate a snapshot (e.g., second snapshot) of the particular virtual machine for the version corresponding to the second point in time. The second snapshot may include the one or more data blocks ("allocated data blocks") that have been identified as changed and allocated, in conjunction with associated metadata of the virtual machine. The metadata of the virtual machine may include a number of configuration properties, such as virtual CPUs, memory, virtual disks, disk formats, and disk sizes associated with the number of virtual disks.

In various embodiments, the particular virtual machine is configured to be communicatively coupled to virtual disks associated with thin provision virtual disk format ("thin disk"), or virtual disks associated with thick provision lazy zeroed virtual disk format ("thick lazy disk"), or both. Both thin disk and thick lazy disk are types of virtual disks that allocate disk space on demand. Specifically, upon creation, a thin disk allows provisioning of storage space based on the virtual disk size, and uses (e.g., allocates) as much space as needed (e.g., on-demand) for the initial operations. The rest of the provisioned disk space is unused or unallocated (e.g., not zeroed out). Thick lazy disk reserves storage space upon creation. The reserved storage space is initially unused or unallocated (e.g., not zeroed out), and will be used (e.g., zeroed out) as much as needed based on a later demand on the first write from the virtual machine. It shall be understood that the data management approach may apply to other types of virtual disks or disk formats, and is not necessarily limited to the type of virtual disks as described herein.

In various embodiments, the data management system may gain access to the CBT data from a unit internal to the system or from a third-party system via an API call (e.g., via the VMware SDK API). In the latter situation, the data management system may send a request via an API (e.g., VMware SDK API) to the third-party system requesting to receive CBT data currently available for a particular virtual machine. The CBT data includes a set of changed data blocks indicating data changes between the first point in time and the second point in time (e.g., at the time of the request). In various embodiments, the data management system may gain access to the block allocation status data of the set of data blocks from an internal unit or a third party system via the API. In various embodiments, the API, via which the data management system accesses CBT data, may be the same API via which the data management system accesses block allocation status data. The block allocation status data includes allocation status data of each block within the set of data blocks. The set of data blocks may include both allocated blocks and unallocated blocks, all allocated blocks, or all unallocated blocks. Upon identifying allocated blocks from the set of the changed data blocks, the data management system stores the allocated blocks to an associated storage appliance for data backup, such as the generation of snapshots, etc. The allocated blocks from the set of the changed data blocks may be illustrated as blocks 606 (see FIG. 6) that are both changed and allocated based on CBT data and the block allocation status data. In various embodiments, upon identifying the allocated blocks from the set of changed data blocks, the processor may send a request via an API (e.g., VMware VixDiskLib API) to the hypervisor of the virtual machine to ingest the allocated block for downstream data backup and recovery operations. Upon receiving such a request, the hypervisor may cause the virtual machine to transmit the identified blocks via a network.

In various embodiments, the data management system generates a second snapshot based on the allocated blocks and associated metadata of the particular virtual machine at the second point in time. In various embodiments, the data management system receives a request to restore the particular virtual machine to a version corresponding to the second point in time. Upon such request, the data management system exports the second snapshots to the storage site that hosts the virtual machine, and restores the virtual machine using the one or more allocated data blocks and the associated metadata. In various embodiments, the storage site may be native to the data management system or be a third-party storage platform external to the data management system.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
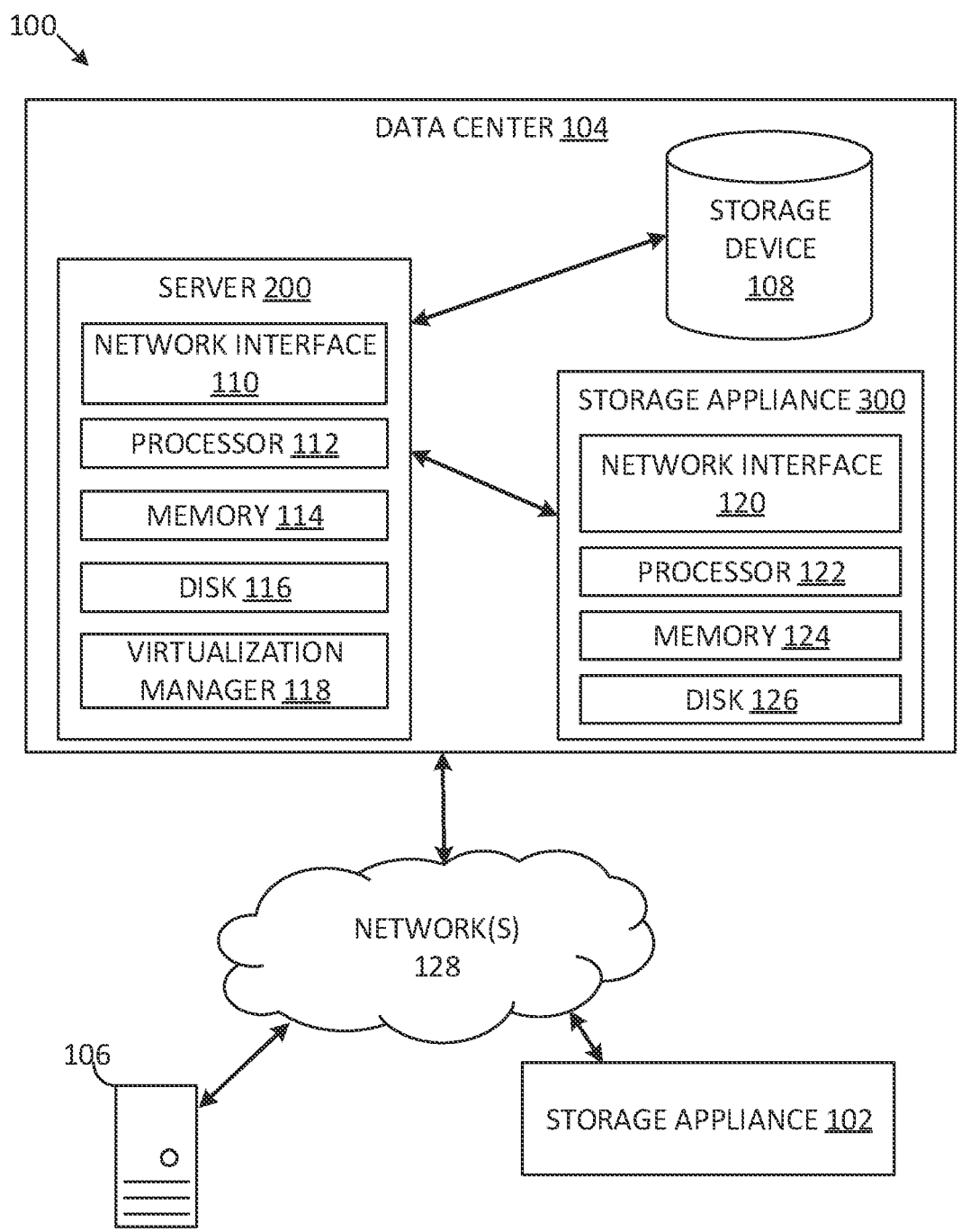
FIG. 1 depicts one embodiment of a networked computing environment in which the disclosed technology may be practiced, according to some embodiments.

FIG. 1 depicts one embodiment of a networked computing environment 100 in which the disclosed technology may be practiced. As depicted, the networked computing environment 100 includes a data center 104, a storage appliance 102, and a computing device 106 in communication with each other via one or more networks 128. The networked computing environment 100 may also include a plurality of computing devices interconnected through one or more networks 128. The one or more networks 128 may allow computing devices and/or storage devices to connect to and communicate with other computing devices and/or other storage devices. In some embodiments, the networked computing environment 100 may include other computing devices and/or other storage devices not shown. The other computing devices may include, for example, a mobile computing device, a non-mobile computing device, a server, a work-station, a laptop computer, a tablet computer, a desktop computer, or an information processing system. The other storage devices may include, for example, a storage area network storage device, a networked-attached storage device, a hard disk drive, a solid-state drive, or a data storage system.

Figure 3:
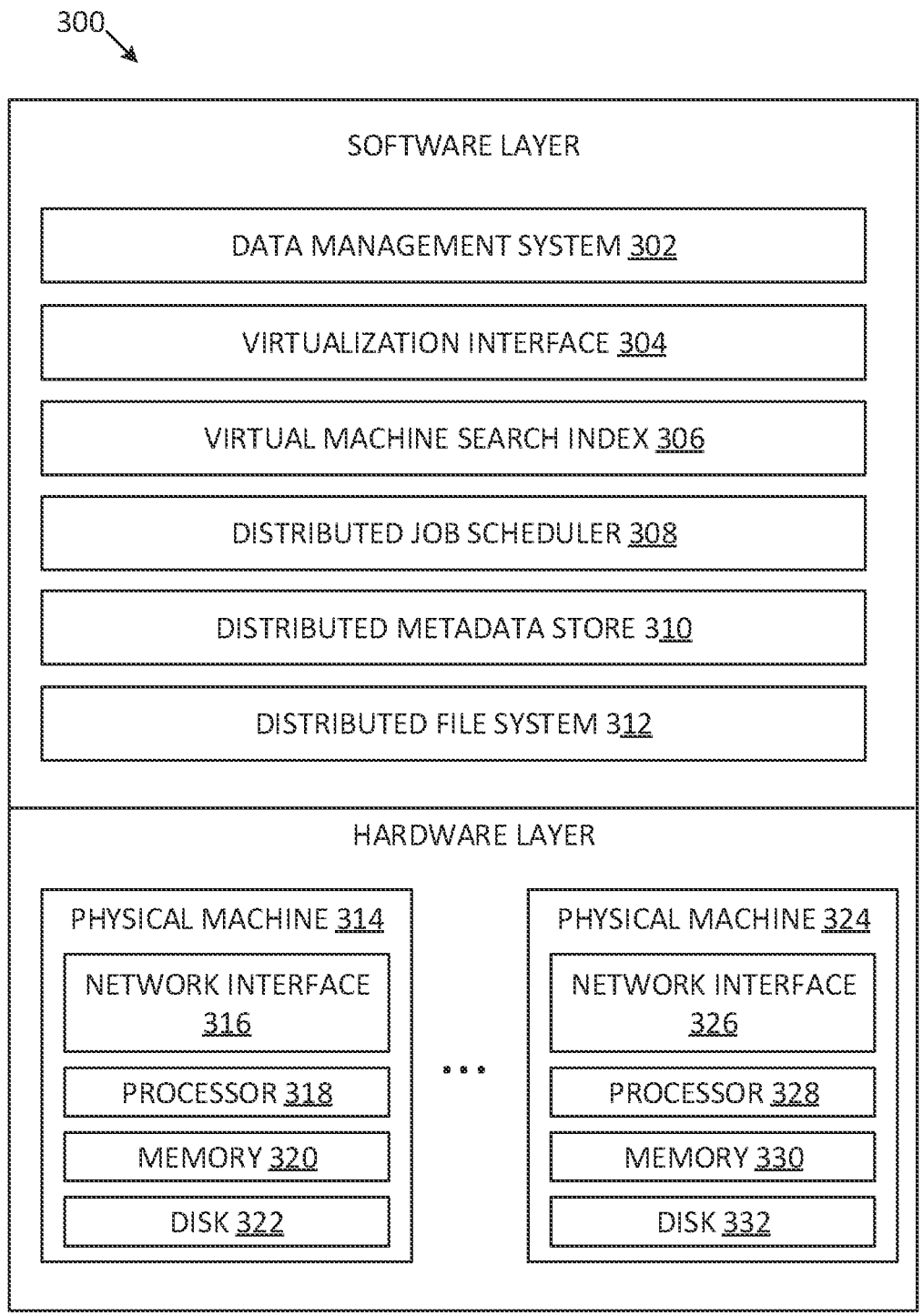
FIG. 3 depicts one embodiment of the storage appliance of FIG. 1, according to some embodiments.

The data center 104 may include one or more servers, such as server 200, in communication with one or more storage devices, such as storage device 108. One or more servers may also be in communication with one or more storage appliances, such as storage appliance 102. The server 200, storage device 108, and storage appliance 300 may be in communication with each other via a networking fabric connecting servers and data storage units within the data center 104 to each other. The storage appliance 300 may include a data management system for backing up virtual machines and files within a virtualized infrastructure. In some embodiments, the storage appliance 300 includes a data management system 302 (as illustrated in FIG. 3) for managing data backup and recovery using allocated data blocks. The server 200 may be used to create and manage one or more virtual machines associated with a virtualized infrastructure. In various embodiments, the data management system 302 may instead reside on server 200, or reside on both the storage appliance 300 and the server 200, in which case the data management system comprises a server module (not shown) in the server 200, and a storage appliance module (not shown) in the storage appliance 300. The server module and the storage appliance module communicate with each other to facilitate data backup and recovery operations, and other operations as described herein.

One or more virtual machines may run various applications, such as a database application or a web server. The storage device 108 may include one or more hardware storage devices for storing data, such as a hard disk drive (HDD), a magnetic tape drive, a solid-state drive (SSD), a storage area network (SAN) storage device, or a Networked-Attached Storage (NAS) device. In some embodiments, a data center, such as data center 104, may include thousands of servers and/or data storage devices in communication with each other. The one or more data storage devices 108 may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

The one or more networks 128 may include a secure network such as an enterprise private network, an unsecured network such as a wireless open network, a local area network (LAN), a wide area network (WAN), and the Internet. The one or more networks 128 may include a cellular network, a mobile network, a wireless network, or a wired network. Each network of the one or more networks 128 may include hubs, bridges, routers, switches, and wired transmission media such as a direct-wired connection. The one or more networks 128 may include an extranet or other private network for securely sharing information or providing controlled access to applications or files.

A server, such as server 200, may allow a client to download information or files (e.g., executable, text, application, audio, image, or video files) from the server 200 or to perform a search query related to particular information stored on the server 200. In some embodiments, a server may act as an application server or a file server. In general, server 200 may refer to a hardware device that acts as the host in a client-server relationship or a software process that shares a resource with or performs work for one or more clients.

One embodiment of server 200 includes a network interface 110, processor 112, memory 114, disk 116, and virtualization manager 118 all in communication with each other. Network interface 110 allows server 200 to connect to one or more networks 128. Network interface 110 may include a wireless network interface and/or a wired network interface. Processor 112 allows server 200 to execute non-transitory computer-readable instructions stored in memory 114 in order to perform processes described herein. Processor 112 may include one or more processing units, such as one or more CPUs and/or one or more GPUs. Memory 114 may comprise one or more types of memory (e.g., RAM, SRAM, DRAM, ROM, EEPROM, Flash, etc.). Disk 116 may include a hard disk drive and/or a solid-state drive. Memory 114 and disk 116 may comprise hardware storage devices.

The virtualization manager 118 may manage a virtualized infrastructure and perform management operations associated with the virtualized infrastructure. The virtualization manager 118 may manage the provisioning of virtual machines running within the virtualized infrastructure and provide an interface to computing devices interacting with the virtualized infrastructure. In one example, the virtualization manager 118 may set a virtual machine having a virtual disk into a frozen state in response to a snapshot request made via an application programming interface (API) by a storage appliance, such as storage appliance 300. Setting the virtual machine into a frozen state may allow a snapshot of the virtual machine to be stored or transferred. In one example, updates made to a virtual machine that has been set into a frozen state may be written to a separate file (e.g., an update file), while the virtual disk may be set into a read-only state to prevent modifications to the virtual disk file while the virtual machine is in the frozen state.

The virtualization manager 118 may then transfer backup data associated with the virtual machine to a storage appliance (e.g., a storage appliance 102 or storage appliance 300 of FIG. 1, described further below) in response to a request made by a user via the storage appliance. For example, the backup data may include a snapshot of the virtual machine. A base snapshot may be generated based on a complete image of the virtual machine. An incremental snapshot may be generated based on a portion of the image of the virtual machine. The portion of the image may be a portion of the virtual disk files associated with the state of the virtual disk associated with the virtual machine at the point in time when the snapshot is taken.

In some embodiments, after the data associated with the point in time snapshot of the virtual machine has been transferred to the storage appliance 300, the virtual machine may be released from the frozen (e.g., unfrozen) state and the data updates made to the virtual machine and stored in the separate file may be merged into the virtual disk file. The virtualization manager 118 may perform various virtual machine-related tasks, such as cloning virtual machines, creating new virtual machines, monitoring the state of virtual machines, moving virtual machines between physical hosts for load balancing purposes, and facilitating backups of virtual machines.

In some embodiments, the storage appliance 300 and storage appliance 102 each includes a network interface 120, processor 122, memory 124, and disk 126 all in communication with each other. Network interface 120 allows storage appliance 300 to connect to one or more networks 128. Network interface 120 may include a wireless network interface and/or a wired network interface. Processor 122 allows storage appliance 300 to execute non-transitory computer-readable instructions stored in memory 124 in order to perform processes described herein. Processor 122 may include one or more processing units, such as one or more CPUs and/or one or more GPUs. Memory 124 may comprise one or more types of memory (e.g., RAM, SRAM, DRAM, ROM, EEPROM, NOR Flash, NAND Flash, etc.). Disk 126 may include a hard disk drive and/or a solid-state drive. Memory 124 and disk 126 may comprise hardware storage devices.

In some embodiments, the storage appliance 300 may include four machines. Each of the four machines may include a multi-core CPU, 64 GB of RAM, a 400 GB SSD, three 4 TB HDDs, and a network interface controller. In this case, the four machines may be in communication with one or more networks 128 via the four network interface controllers. The four machines may comprise four nodes of a server cluster. The server cluster may comprise a set of physical machines that are connected together via a network. The server cluster may be used for storing data associated with a plurality of virtual machines, such as backup data associated with different point-in-time versions of the virtual machines.

The networked computing environment 100 may provide a cloud computing environment for one or more computing devices. Cloud computing may refer to Internet-based computing, wherein shared resources, software, and/or information may be provided to one or more computing devices on-demand via the Internet. The networked computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end-users over the Internet. In some embodiments, the networked computing environment 100 may include a virtualized infrastructure that provides software, data processing, and/or data storage services to end-users accessing the services via the networked computing environment 100. In one example, networked computing environment 100 may provide cloud-based work productivity or business-related applications to a computing device, such as computing device 106. The storage appliance 102 may comprise a cloud-based data management system for backing up virtual machines and/or files within a virtualized infrastructure, such as virtual machines running on server 200/or files stored on server 200.

In some embodiments, networked computing environment 100 may provide remote access to secure applications and files stored within data center 104 from a remote computing device, such as computing device 106. The data center 104 may use an access control application to manage remote access to protected resources, such as protected applications, databases, or files located within the data center 104. To facilitate remote access to secure applications and files, a secure network connection may be established using a virtual private network (VPN). A VPN connection may allow a remote computing device, such as computing device 106, to securely access data from a private network (e.g., from a company file server or mail server) using an unsecured public network or the Internet. The VPN connection may require client-side software (e.g., running on the remote computing device) to establish and maintain the VPN connection. The VPN client software may provide data encryption and encapsulation prior to the transmission of secure private network traffic through the Internet.

In some embodiments, the storage appliance 300 may manage the extraction and storage of virtual machine snapshots associated with different versions of one or more virtual machines running within the data center 104. A snapshot of a virtual machine may correspond with a state of the virtual machine at a particular point in time. In response to a restore command from the storage device 108, the storage appliance 300 may restore a point-in-time version of a virtual machine (e.g., base snapshot) or restore point-in-time versions of one or more disk files located on the virtual machine (e.g., incremental snapshot) and transmit the restored data to the server 200. To improve storage density, the storage appliance 300 may deduplicate and compress data associated with different versions of a virtual machine and/or deduplicate and compress data associated with different virtual machines. To improve system performance, the storage appliance 300 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point in time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 300 may provide a user interface (e.g., a web-based interface or a graphical user interface) that displays virtual machine backup information such as identifications of the protected virtual machines and the historical versions or time machine views for each of the protected virtual machines. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end-user of the storage appliance 300 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 300 may run an NFS server and make the particular version (or a copy of the particular version) of the virtual machine accessible for reading and writing. The end-user of the storage appliance 300 may then select the particular version to be mounted and run an application (e.g., a data analytics application) using the mounted version of the virtual machine. In another example, the particular version may be mounted as an Internet Small Computer System Interface (iSCSI) target.

Figure 2:
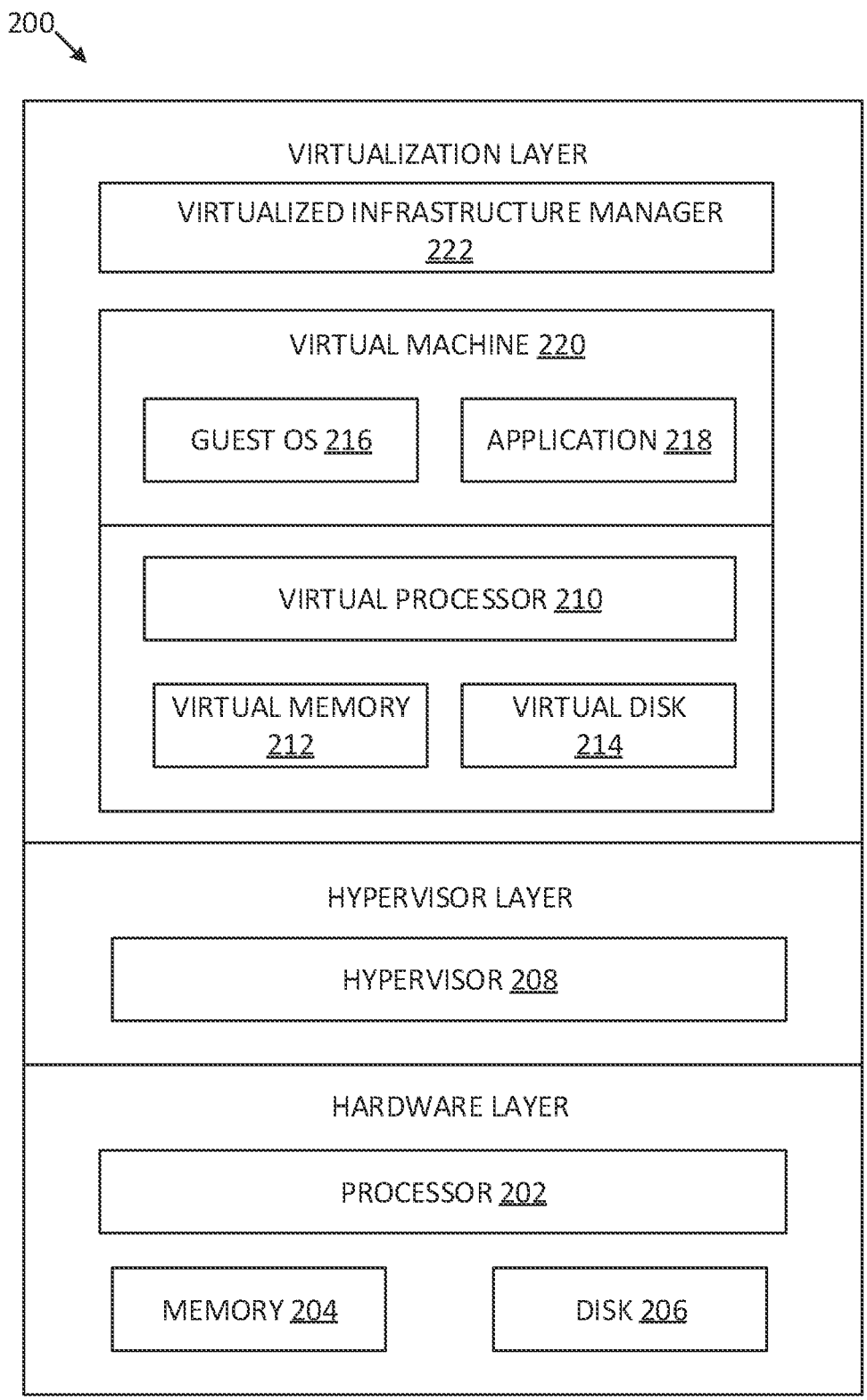
FIG. 2 depicts one embodiment of the server of FIG. 1, according to some embodiments.

FIG. 2 depicts one embodiment of server 200 of FIG. 1. The server 200 may comprise one server out of a plurality of servers that are networked together within a data center (e.g., data center 104). In one example, the plurality of servers may be positioned within one or more server racks within the data center. As depicted, server 200 includes hardware-level components and software-level components. The hardware-level components include one or more processors 202, one or more memory 204, and one or more disks 206. The software-level components include a hypervisor 208, a virtualized infrastructure manager 222, and one or more virtual machines, such as virtual machine 220. The hypervisor 208 may comprise a native hypervisor or a hosted hypervisor. The hypervisor 208 may provide a virtual operating platform for running one or more virtual machines, such as virtual machine 220. Virtual machine 220 includes a plurality of virtual hardware devices, including a virtual processor 210, a virtual memory 212, and a virtual disk 214. The virtual disk 214 may comprise a file stored within one or more disks 206. In one example, a virtual machine 220 may include a plurality of virtual disks 214, with each virtual disk of the plurality of virtual disks 214 associated with a different file stored on one or more disks 206. In various embodiments, a virtual machine may be configured to be communicatively coupled to virtual disks 214 associated with thin provision virtual disk format ("thin disk"), or virtual disks 214 associated with thick provision lazy zeroed virtual disk format ("thick lazy disk"), or both.

Both thin disk and thick lazy disk are types of virtual disks that allocate disk space on demand. Specifically, upon creation, thin disk allows provisioning of storage space based on the virtual disk size, and uses (e.g., allocates) as much space as need (e.g., on-demand) for the initial operations. The rest of the provisioned disk space is unused or unallocated (e.g., not zeroed out). Thick lazy disk reserves storage space upon creation. The reserved storage space is initially unused or unallocated (e.g., not zeroed out), and will be used (e.g., zeroed out) as much as needed based on a later demand on the first write from the virtual machine. It shall be understood that the data management approach may be applicable to other types of virtual disks or disk formats and is by no means limited to the type of virtual disks as described herein. Virtual machine 220 may include a guest operating system 216 that runs one or more applications, such as application 218.

The virtualized infrastructure manager 222, which may correspond with the virtualization manager 118 in FIG. 1, may run on a virtual machine or natively on the server 200. The virtual machine may, for example, be or include the virtual machine 220 or a virtual machine separate from the server 200. Other arrangements are possible. The virtualized infrastructure manager 222 may provide a centralized platform for managing a virtualized infrastructure that includes a plurality of virtual machines. The virtualized infrastructure manager 222 may manage the provisioning of virtual machines running within the virtualized infrastructure and provide an interface to computing devices interacting with the virtualized infrastructure. The virtualized infrastructure manager 222 may perform various virtualized infrastructure-related tasks, such as cloning virtual machines, creating new virtual machines, monitoring the state of virtual machines, and facilitating backups of virtual machines.

In some embodiments, server 200 may use the virtualized infrastructure manager 222 to facilitate backups for a plurality of virtual machines (e.g., eight different virtual machines) running on server 200. Each virtual machine running on server 200 may run its own guest operating system and its own set of applications. Each virtual machine running on the server 200 may store its own set of files using one or more virtual disks associated with the virtual machine (e.g., each virtual machine may include two virtual disks that are used for storing data associated with the virtual machine).

In some embodiments, a data management application running on a storage appliance, such as storage appliance 102 in FIG. 1 or storage appliance 300 in FIG. 1, may request a snapshot of a virtual machine running on server 200. The snapshot of the virtual machine may be stored as one or more files, with each file associated with a virtual disk of the virtual machine. A snapshot of a virtual machine may correspond with a state of the virtual machine at a particular point in time. The particular point in time may be associated with a time stamp. In one example, a first snapshot of a virtual machine may correspond with a first state of the virtual machine (including the state of applications and files stored on the virtual machine) at a first point in time and a second snapshot of the virtual machine may correspond with a second state of the virtual machine at a second point in time subsequent to the first point in time.

In response to a request for a snapshot of a virtual machine at a particular point in time, the virtualized infrastructure manager 222 may set the virtual machine into a frozen state or store a copy of the virtual machine at the particular point in time. The virtualized infrastructure manager 222 may then transfer data associated with the virtual machine (e.g., an image of the virtual machine or a portion of the image of the virtual machine) to the storage appliance 300 or storage appliance 102. The data (e.g., backup data) associated with the virtual machine may include a set of files, including a virtual disk file storing contents of a virtual disk of the virtual machine at the particular point in time and a virtual machine configuration file (e.g., database schema and database control logic data items) storing configuration settings for the virtual machine at the particular point in time. The contents of the virtual disk file may include the operating system used by the virtual machine, local applications stored on the virtual disk, and user files (e.g., images and word processing documents). In some embodiments, the virtualized infrastructure manager 222 may transfer a full image of the virtual machine to the storage appliance 102 or storage appliance 300 of FIG. 1 or a plurality of data blocks corresponding with the full image (e.g., to enable a full image-level backup of the virtual machine to be stored on the storage appliance). In other cases, the virtualized infrastructure manager 222 may transfer a portion of an image of the virtual machine associated with data that has changed since an earlier point in time prior to the particular point in time or since a last snapshot of the virtual machine was taken. In one example, the virtualized infrastructure manager 222 may transfer only data associated with virtual blocks stored on a virtual disk of the virtual machine that have changed since the last snapshot of the virtual machine was taken. In some embodiments, the data management application may specify a first point in time and a second point in time, and the virtualized infrastructure manager 222 may output one or more virtual data blocks that have been modified between the first point in time and the second point in time.

In some embodiments, the server 200 or the hypervisor 208 may communicate with a storage appliance, such as storage appliance 102 in FIG. 1 or storage appliance 300 in FIG. 1, using a distributed file system protocol such as Network File System (NFS) Version 3, or Server Message Block (SMB) protocol. The distributed file system protocol may allow the server 200 or the hypervisor 208 to access, read, write, or modify files stored on the storage appliance as if the files were locally stored on the server 200. The distributed file system protocol (e.g., Network File System ("NFS") protocol) may allow the server 200 or the hypervisor 208 to mount a directory or a portion of a file system located within the storage appliance.

FIG. 3 depicts one embodiment of storage appliance 300 in FIG. 1. The storage appliance may include a plurality of physical machines and virtual machines that may act in concert as a single computing system. Each physical machine of the plurality of physical machines may comprise a node in a cluster. In one example, the storage appliance may be positioned within a server rack within a data center. As depicted, the storage appliance 300 includes hardware-level components and software-level components. The hardware-level components include one or more physical machines, such as physical machine 314 and physical machine 324. The physical machine 314 includes a network interface 316, processor 318, memory 320, and disk 322, all in communication with each other. Processor 318 allows physical machine 314 to execute non-transitory computer-readable instructions stored in memory 320 to perform processes described herein. Disk 322 may include a hard disk drive and/or a solid-state drive. The physical machine 324 includes a network interface 326, processor 328, memory 330, and disk 332, all in communication with each other. Processor 328 allows physical machine 324 to execute computer-readable instructions stored in memory 330 to perform processes described herein. Disk 332 may include a hard disk drive and/or a solid-state drive. In some embodiments, disk 332 may include a flash-based SSD or a hybrid HDD/SSD drive. In some embodiments, the storage appliance 300 may include a plurality of physical machines arranged in a cluster (e.g., eight machines in a cluster). Each of the plurality of physical machines may include a plurality of multi-core CPUs, 108 GB of RAM, a 500 GB SSD, four 4 TB HDDs, and a network interface controller.

In some embodiments, the plurality of physical machines may be used to implement a cluster-based network file-server. The cluster-based network file server may neither require nor use a front-end load balancer. One issue with using a front-end load balancer to host the IP address for the cluster-based network file server and to forward requests to the nodes of the cluster-based network file server is that the front-end load balancer comprises a single point of failure for the cluster-based network file server. In some embodiments, the file system protocol is used by a server, such as server 200 in FIG. 1, or a hypervisor, such as hypervisor 208 in FIG. 2, to communicate with the storage appliance 300, which may not provide a failover mechanism (e.g., NFS Version 3). In the case that no failover mechanism is provided on the client-side, the hypervisor may not be able to connect to a new node within a cluster in the event that the node connected to the hypervisor fails.

In some embodiments, each node in a cluster may be connected to each other via a network and may be associated with one or more IP addresses (e.g., two different IP addresses may be assigned to each node). In one example, each node in the cluster may be assigned a permanent IP address and a floating IP address and may be accessed using either the permanent IP address or the floating IP address. In some embodiments, a cluster may include a plurality of nodes and each node of the plurality of nodes may be assigned a different floating IP address. In this case, a first hypervisor may be configured with a first floating IP address associated with a first node in the cluster, a second hypervisor may be configured with a second floating IP address associated with a second node in the cluster, and a third hypervisor may be configured with a third floating IP address associated with a third node in the cluster.

In some embodiments, a cluster may include five nodes, such as nodes 1-5. Each of the five nodes runs from different machines, such as physical machine 314 in FIG. 3 or virtual machine 220 in FIG. 2. Nodes in a cluster can include instances of peer nodes of a distributed database (e.g., cluster-based database, distributed decentralized database management system, a NoSQL database, Apache Cassandra, DataStax, MongoDB, CouchDB), according to some embodiments. The distributed file system 312 is distributed in that data is sharded or distributed across the cluster in shards or chunks and decentralized in that there is no central storage device and no single point of failure. The system operates under the assumption that multiple nodes may go down, up, or become non-responsive.

In some embodiments, data written to one of the nodes may be replicated to one or more other nodes per a replication protocol of the cluster. For example, data written to node 1 can be replicated to nodes 2 and 3. If node 1 prematurely terminates, node 2 and/or 3 can be used to provide the replicated data. In some embodiments, each node of the cluster may frequently exchange state information about itself and other nodes across the cluster using gossip protocol. Gossip protocol is a peer-to-peer communication protocol in which each node randomly shares (e.g., communicates, requests, transmits) location and state information about the other nodes in a given cluster.

Writing: For a given node, a sequentially written commit log captures the write activity to ensure data durability. The data is then written to an in-memory structure (e.g., a memtable, write-back cache). Each time the in-memory structure is full, the data is written to disk in a Sorted String Table data file. In some embodiments, writes are automatically partitioned and replicated throughout the cluster.

Reading: Any node of a cluster can receive a read request (e.g., query) from an external client. If the node that receives the read request manages the data requested, the node provides the requested data. If the node does not manage the data, the node determines which node manages the requested data. The node that received the read request then acts as a proxy between the requesting entity and the node that manages the data (e.g., the node that manages the data sends the data to the proxy node, which then provides the data to an external entity that generated the request).

As depicted in FIG. 3, the software-level components of the storage appliance 300 may include data management system 302, a virtualization interface 304, a distributed job scheduler 308, a distributed metadata store 310, a distributed file system 312, and one or more virtual machine search indexes, such as virtual machine search index 306. In some embodiments, the data management system 302 may be a software-level component of a storage appliance 300 in a networked computing environment 100.

In various embodiments, the data management system 302 may be responsible for accessing (or receiving) changed block tracking (CBT) data and block allocation status data from a virtual machine 220, identifying one or more allocated data blocks from the changed blocks based on the CBT data and block allocation status data, and ingesting only those identified one or more data blocks for downstream data backup and recovery operations. This way, the data management system may avoid ingesting unchanged data blocks or changed data blocks that have already been deleted (e.g., unallocated) back to the storage appliance for backup. This approach may significantly reduce inbound (e.g., data ingestion) and outbound (e.g., data export) network traffic, and improve system performance and the efficiency of data export and recovery.

In some embodiments, the software-level components of the storage appliance 300 may be run using a dedicated hardware-based appliance. In another embodiment, the software-level components of the storage appliance 300 may be run from the cloud (e.g., the software-level components may be installed on a cloud service provider).

In some embodiments, the data storage across a plurality of nodes in a cluster (e.g., the data storage available from one or more physical machines (e.g., physical machine 314 and physical machine 324)) may be aggregated and made available over a single file system namespace (e.g., /snapshots/). A directory for each virtual machine protected using the storage appliance 300 may be created (e.g., the directory for Virtual Machine A may be /snapshots/VM_A). Snapshots and other data associated with a virtual machine may reside within the directory for the virtual machine. In one example, snapshots of a virtual machine may be stored in subdirectories of the directory (e.g., a first snapshot of Virtual Machine A may reside in/snapshots/VM_A/sl/and a second snapshot of Virtual Machine A may reside in /snapshots/VM_A/s2/).

The distributed file system 312 may present itself as a single file system, in which as new physical machines or nodes are added to the storage appliance 300, the cluster may automatically discover the additional nodes and automatically increase the available capacity of the file system for storing files and other data. Each file stored in the distributed file system 312 may be partitioned into one or more chunks or shards. Each of the one or more chunks may be stored within the distributed file system 312 as a separate file. The files stored within the distributed file system 312 may be replicated or mirrored over a plurality of physical machines, thereby creating a load-balanced and fault-tolerant distributed file system. In one example, storage appliance 300 may include ten physical machines arranged as a failover cluster and a first file corresponding with a snapshot of a virtual machine (e.g., /snapshots/VM_A/s1/s1.full) may be replicated and stored on three of the ten machines.

The distributed metadata store 310 may include a distributed database management system that provides high availability without a single point of failure. In some embodiments, the distributed metadata store 310 may comprise a database, such as a distributed document-oriented database. The distributed metadata store 310 may be used as a distributed key value storage system. In one example, the distributed metadata store 310 may comprise a distributed NoSQL key value store database. In some embodiments, the distributed metadata store 310 may include a partitioned row store, in which rows are organized into tables or other collections of related data held within a structured format within the key value store database. A table (or a set of tables) may be used to store metadata information associated with one or more files stored within the distributed file system 312. The metadata information may include the name of a file, a size of the file, file permissions associated with the file, when the file was last modified, and file mapping information associated with an identification of the location of the file stored within a cluster of physical machines. In some embodiments, a new file corresponding with a snapshot of a virtual machine may be stored within the distributed file system 312 and metadata associated with the new file may be stored within the distributed metadata store 310. The distributed metadata store 310 may also be used to store a backup schedule for the virtual machine and a list of snapshots for the virtual machine that is stored using the storage appliance 300.

In some embodiments, the distributed metadata store 310 may be used to manage one or more versions of a virtual machine. Each version of the virtual machine may correspond with a full image snapshot of the virtual machine stored within the distributed file system 312 or an incremental snapshot of the virtual machine (e.g., a forward incremental or reverse incremental) stored within the distributed file system 312. In some embodiments, one or more versions of the virtual machine may correspond with a plurality of files. The plurality of files may include a single full image snapshot of the virtual machine and one or more incremental aspects derived from the single full image snapshot. The single full image snapshot of the virtual machine may be stored using a first storage device of a first type (e.g., a HDD) and the one or more incremental aspects derived from the single full image snapshot may be stored using a second storage device of a second type (e.g., an SSD). In this case, only a single full image needs to be stored and each version of the virtual machine may be generated from the single full image or the single full image combined with a subset of the one or more incremental aspects. Furthermore, each version of the virtual machine may be generated by performing a sequential read from the first storage device (e.g., reading a single file from a HDD) to acquire the full image and, in parallel, performing one or more reads from the second storage device (e.g., performing fast random reads from an SSD) to acquire the one or more incremental aspects.

The distributed job scheduler 308 may be used for scheduling backup jobs that acquire and store virtual machine snapshots for one or more virtual machines over time. The distributed job scheduler 308 may follow a backup schedule to back up an entire image of a virtual machine at a particular point in time or one or more virtual disks associated with the virtual machine at a particular point in time. In one example, the backup schedule may specify that the virtual machine be backed up at a snapshot capture frequency, such as every two hours or every 24 hours. Each backup job may be associated with one or more tasks to be performed in a sequence. Each of the one or more tasks associated with a job may be run on a particular node within a cluster. In some embodiments, the distributed job scheduler 308 may schedule a specific job to be run on a particular node based on data stored on the particular node. For example, the distributed job scheduler 308 may schedule a virtual machine snapshot job to be run on a node in a cluster that is used to store snapshots of the virtual machine in order to reduce network congestion.

The distributed job scheduler 308 may comprise a distributed fault tolerant job scheduler, in which jobs affected by node failures are recovered and rescheduled to be run on available nodes. In some embodiments, the distributed job scheduler 308 may be fully decentralized and implemented without the existence of a master node. The distributed job scheduler 308 may run job scheduling processes on each node in a cluster or on a plurality of nodes in the cluster. In one example, the distributed job scheduler 308 may run a first set of job scheduling processes on a first node in the cluster, a second set of job scheduling processes on a second node in the cluster, and a third set of job scheduling processes on a third node in the cluster. The first set of job scheduling processes, the second set of job scheduling processes, and the third set of job scheduling processes may store information regarding jobs, schedules, and the states of jobs using a metadata store, such as distributed metadata store 310. In the event that the first node running the first set of job scheduling processes fails (e.g., due to a network failure or a physical machine failure), the states of the jobs managed by the first set of job scheduling processes may fail to be updated within a threshold period of time (e.g., a job may fail to be completed within 30 seconds or within minutes from being started). In response to detecting jobs that have failed to be updated within the threshold period of time, the distributed job scheduler 308 may undo and restart the failed jobs on available nodes within the cluster.

The job scheduling processes running on at least a plurality of nodes in a cluster (e.g., on each available node in the cluster) may manage the scheduling and execution of a plurality of jobs. The job scheduling processes may include run processes for running jobs, cleanup processes for cleaning up failed tasks, and rollback processes for rolling-back or undoing any actions or tasks performed by failed jobs. In some embodiments, the job scheduling processes may detect that a particular task for a particular job has failed and in response, may perform a cleanup process to clean up or remove the effects of the particular task and then perform a rollback process that processes one or more completed tasks for the particular job in reverse order to undo the effects of the one or more completed tasks. Once the particular job with the failed task has been undone, the job scheduling processes may restart the particular job on an available node in the cluster.

The distributed job scheduler 308 may manage a job in which a series of tasks associated with the job is to be performed atomically (i.e., partial execution of the series of tasks is not permitted). If the series of tasks cannot be completely executed or there is any failure that occurs to one of the series of tasks during execution (e.g., a hard disk associated with a physical machine fails or a network connection to the physical machine fails), then the state of a data management system may be returned to a state as if none of the series of tasks was ever performed. The series of tasks may correspond with an ordering of tasks for the series of tasks and the distributed job scheduler 308 may ensure that each task of the series of tasks is executed based on the ordering of tasks. Tasks that do not have dependencies with each other may be executed in parallel.

In some embodiments, the distributed job scheduler 308 may schedule each task of a series of tasks to be performed on a specific node in a cluster. In other cases, the distributed job scheduler 308 may schedule a first task of the series of tasks to be performed on a first node in a cluster and a second task of the series of tasks to be performed on a second node in the cluster. In these cases, the first task may have to operate on a first set of data (e.g., a first file stored in a file system) stored on the first node and the second task may have to operate on a second set of data (e.g., metadata related to the first file that is stored in a database) stored on the second node. In some embodiments, one or more tasks associated with a job may have an affinity to a specific node in a cluster.

In one example, if one or more tasks require access to a database that has been replicated on three nodes in a cluster, then the one or more tasks may be executed on one of the three nodes. In another example, if the one or more tasks require access to multiple chunks of data associated with a virtual disk that has been replicated over four nodes in a cluster, then the one or more tasks may be executed on one of the four nodes. Thus, the distributed job scheduler 308 may assign one or more tasks associated with a job to be executed on a particular node in a cluster based on the location of data to be accessed by the one or more tasks.

In some embodiments, the distributed job scheduler 308 may manage a first job associated with capturing and storing a snapshot of a virtual machine periodically (e.g., every 30 minutes). The first job may include one or more tasks, such as communicating with a virtualized infrastructure manager, such as the virtualized infrastructure manager 222 in FIG. 2, to create a frozen copy of the virtual machine and to transfer one or more chunks (or one or more files) associated with the frozen copy to a storage appliance, such as storage appliance 300 in FIG. 1. The one or more tasks may also include generating metadata for the one or more chunks, storing the metadata using the distributed metadata store 310, storing the one or more chunks within the distributed file system 312, and communicating with the virtualized infrastructure manager 222 that the frozen copy of the virtual machine may be unfrozen or released from a frozen state. The metadata for a first chunk of the one or more chunks may include information specifying a version of the virtual machine associated with the frozen copy, a time associated with the version (e.g., the snapshot of the virtual machine was taken at 5:30 p.m. on Jun. 29, 2018), and a file path to where the first chunk is stored within the distributed file system 92 (e.g., the first chunk is located at/snapshotsNM_B/s1/s1.c-hunk1). The one or more tasks may also include deduplication, compression (e.g., using a lossless data compression algorithm such as LZ4 or LZ77), decompression, encryption (e.g., using a symmetric key algorithm such as Triple DES or AES-256), and decryption related tasks.

The virtualization interface 304 may provide an interface for communicating with a virtualized infrastructure manager managing a virtualization infrastructure, such as virtualized infrastructure manager 222 in FIG. 2, and requesting data associated with virtual machine snapshots from the virtualization infrastructure. The virtualization interface 304 may communicate with the virtualized infrastructure manager using an Application Programming Interface (API) for accessing the virtualized infrastructure manager (e.g., to communicate a request for a snapshot of a virtual machine). In this case, storage appliance 300 may request and receive data from a virtualized infrastructure without requiring agent software to be installed or running on virtual machines within the virtualized infrastructure. The virtualization interface 304 may request data associated with virtual blocks stored on a virtual disk of the virtual machine that have changed since a last snapshot of the virtual machine was taken or since a specified prior point in time. Therefore, in some cases, if a snapshot of a virtual machine is the first snapshot taken of the virtual machine, then a full image of the virtual machine may be transferred to the storage appliance. However, if the snapshot of the virtual machine is not the first snapshot taken of the virtual machine, then only the data blocks of the virtual machine that have changed since a prior snapshot was taken may be transferred to the storage appliance.

The virtual machine search index 306 may include a list of files that have been stored using a virtual machine and a version history for each of the files in the list. Each version of a file may be mapped to the earliest point-in-time snapshot of the virtual machine that includes the version of the file or to a snapshot of the virtual machine that includes the version of the file (e.g., the latest point in time snapshot of the virtual machine that includes the version of the file). In one example, the virtual machine search index 306 may be used to identify a version of the virtual machine that includes a particular version of a file (e.g., a particular version of a database, a spreadsheet, or a word processing document). In some embodiments, each of the virtual machines that are backed up or protected using storage appliance 300 may have a corresponding virtual machine search index.

In some embodiments, as each snapshot of a virtual machine is ingested, each virtual disk associated with the virtual machine is parsed in order to identify a file system type associated with the virtual disk and to extract metadata (e.g., file system metadata) for each file stored on the virtual disk. The metadata may include information for locating and retrieving each file from the virtual disk. The metadata may also include a name of a file, the size of the file, the last time at which the file was modified, and a content checksum for the file. Each file that has been added, deleted, or modified since a previous snapshot was captured may be determined using the metadata (e.g., by comparing the time at which a file was last modified with a time associated with the previous snapshot). Thus, for every file that has existed within any of the snapshots of the virtual machine, a virtual machine search index may be used to identify when the file was first created (e.g., corresponding with a first version of the file) and at what times the file was modified (e.g., corresponding with subsequent versions of the file). Each version of the file may be mapped to a particular version of the virtual machine that stores that version of the file.

In some embodiments, if a virtual machine includes a plurality of virtual disks, then a virtual machine search index may be generated for each virtual disk of the plurality of virtual disks. For example, a first virtual machine search index may catalog and map files located on a first virtual disk of the plurality of virtual disks and a second virtual machine search index may catalog and map files located on a second virtual disk of the plurality of virtual disks. In this case, a global file catalog or a global virtual machine search index for the virtual machine may include the first virtual machine search index and the second virtual machine search index. A global file catalog may be stored for each virtual machine backed up by a storage appliance within a file system, such as distributed file system 312 in FIG. 3.

The data management system 302 may comprise an application running on the storage appliance 300 that manages and stores one or more snapshots of a virtual machine. In one example, the data management system 302 may comprise the highest-level layer in an integrated software stack running on the storage appliance. The integrated software stack may include the data management system 302, the virtualization interface 304, the distributed job scheduler 308, the distributed metadata store 310, and the distributed file system 312.

In some embodiments, the integrated software stack may run on other computing devices, such as a server or computing device 106 in FIG. 1. The data management system 302 may use the virtualization interface 304, the distributed job scheduler 308, the distributed metadata store 310, and the distributed file system 312 to identify data blocks for ingestion, and to generate, manage and store one or more snapshots of a virtual machine. Each snapshot of the virtual machine may correspond with a point-in-time version of the virtual machine. The data management system 302 may generate and manage a list of versions for the virtual machine. Each version of the virtual machine may map to or reference one or more data blocks and/or one or more files stored within the distributed file system 312. Combined together, the one or more data blocks and/or the one or more files stored within the distributed file system 312 may comprise a full image of the version of the virtual machine. In various embodiments, the data management system 302 generates a snapshot (e.g., second snapshot) based on the one or more allocated data blocks ("allocated data blocks") identified based on the CBT data and block allocation status data. The second snapshot is associated with metadata representing a number of virtual machine configuration properties at the second point in time. The virtual machine configuration properties may include a number of virtual CPUs, memory, virtual disks, disk formats, and disk sizes associated with the number of virtual disks. In various embodiments, upon receiving a request to restore the virtual machine to the second point in time version, the data management system may export the second snapshot to the target storage platform (either native or foreign to the primary storage site that hosts the virtual machine), and using the allocated data blocks and the associated metadata contained therein for data export and recovery operations.

Figure 4:
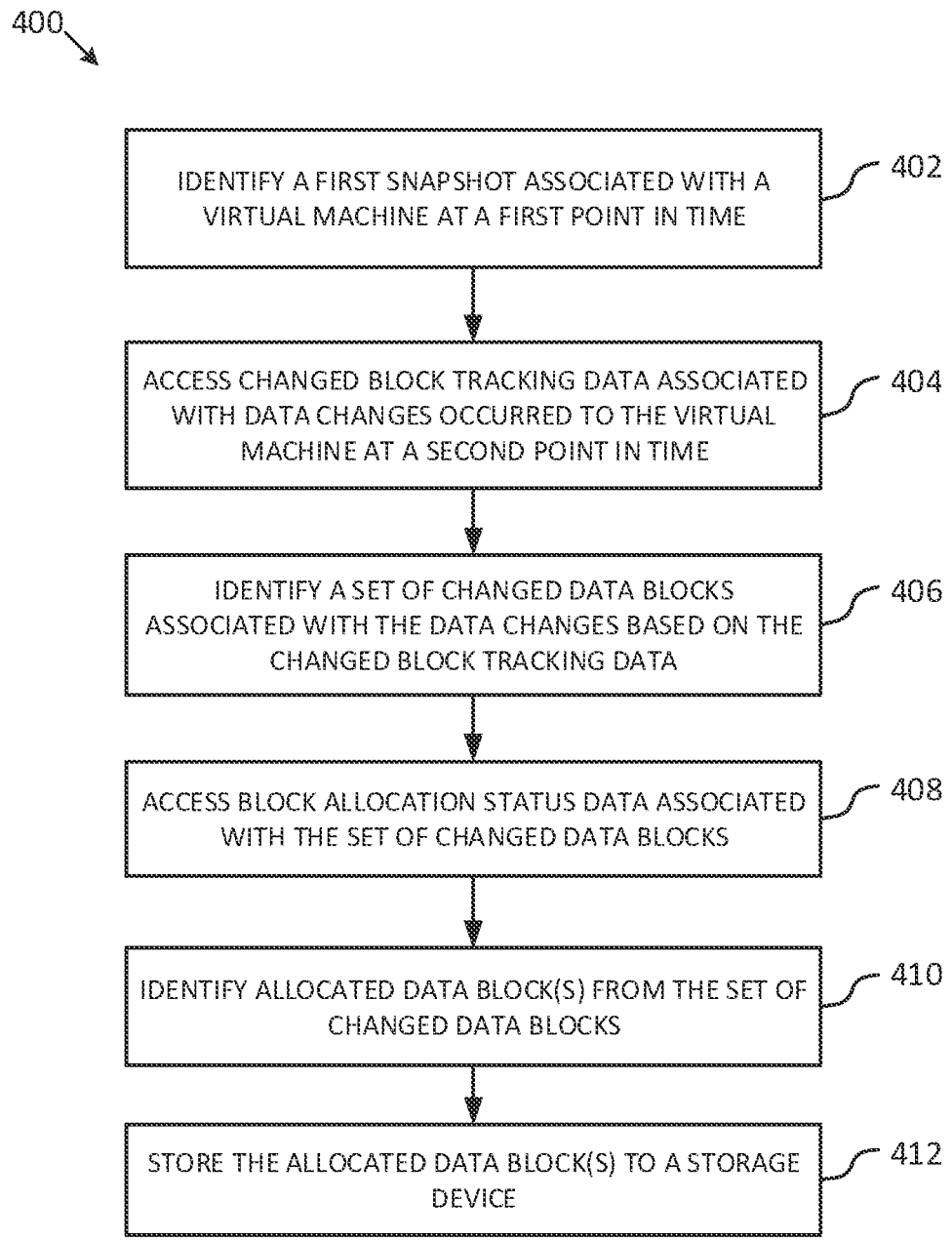
FIG. 4 depicts a block diagram illustrating example data backup and recovery operations in a method, according to some embodiments.

FIG. 4 depicts a block diagram illustrating example data backup and recovery operations in a method 400, according to some embodiments. The operations of method 400 may be performed by any number of different systems, such as the data management system 302 as described herein, or any component thereof, such as a processor included in any of the systems. In various embodiments, the data management system 302 may reside within server 200, as illustrated in FIG. 1 and FIG. 2. In some other embodiments, the data management system 302 may reside in both server 200 and the storage appliance 300, in which case the data management system 302 may comprise a server module (not shown) within the server 200, and a storage appliance module (not shown) within the storage appliance 300. The server module and the storage appliance module communicate with each other to facilitate data backup and recovery operations, and other operations as described herein. Each step of the example method 400 as described herein may be implemented by either or both of the server module and the storage appliance module, and may occur in a different order or be performed on or by other components.

Example methods described herein may also be implemented in the form of executable instructions stored on a machine-readable medium or in the form of electronic circuitry. For instance, the operations of method 400 may be represented by executable instructions that, when executed by a processor of a computing device, cause the computing device to perform method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 402, the processor identifies a first snapshot associated with a virtual machine. The first snapshot is associated with a first point in time and may correspond to the first point in time version of the virtual machine. The first snapshot may be a base snapshot generated based on a complete image of the virtual machine, or an incremental snapshot generated based on a partial image of the virtual machine. The portion of the image may be a portion of the virtual disk files associated with the state of the virtual disk configured for the virtual machine.

At operation 404, the processor accesses changed block tracking (CBT) data associated with data changes that occurred in the virtual machine by the second point in time. The second point in time is subsequent to the first point in time. The data changes may be associated with changes that occurred in the associated virtual disks since the first point in time and up until the second point in time, including the changes that occurred at the second point in time. In various embodiments, the processor may access the CBT data from a computing unit internal to the data management system 302 or the data center 104, or from an external third-party system via an API call. In the latter situation, the data management system may send, via an API call, a request to a hypervisor (e.g., hypervisor 208) associated with the virtual machine to receive CBT data currently available for the virtual machine.

At operation 406, the processor identifies a set of changed data blocks associated with the data changes based on the CBT data. The data changes occurred in the virtual machine between the first point in time and the second point in time (e.g., at the time of the request). Specifically, the set of changed data blocks represents the changes to the disk files within the virtual disks associated with the virtual machine. In various embodiments, the processor may gain access to the CBT data from a computing unit internal to the data management system 302 or the data center 104, or from an external third-party system via an API call (e.g., via the VMware SDK API). In the latter situation, the data management system may send, via an API call, a request to the hypervisor, such as the hypervisor 208, associated with the virtual machine to receive the CBT data.

At operation 408, the processor accesses block allocation status data associated with the set of changed data blocks. In various embodiments, the processor may gain access to the block allocation status data of the set of data blocks from a computing unit internal to the data management system 302 or the data center 104, or from an external third-party system via an API call (e.g., via the VMware SDK API). In the latter situation, the data management system may send, via an API call, a request to the hypervisor, such as the hypervisor 208, associated with the virtual machine to receive block allocation status data. The block allocation status data includes allocation status data of each block within the set of changed data blocks. The set of changed data blocks may include data blocks that are partially allocated, all allocated, or none allocated.

At operation 410, the processor identifies one or more allocated data blocks from the set of changed data blocks that are associated with allocated status based on the block allocation status data. Specifically, the allocated data blocks within the set of changed data blocks are associated with "allocated" status, representing the blocks that were changed but were not yet deleted based on a user-generated or system-generated request. For example, the data changes between two points in time (e.g., the first point in time and the second point in time) indicate 1 terabyte (1TB) file was created but later deleted by a user. Although deleted data blocks may be flagged or marked with "unallocated" block status, they are nevertheless included in the CBT data based on the data changes that occurred during the given time period. If the processor were to ingest the 1 TB deleted file and store it for backup, it would have been a waste of network traffic and storage space, as the large file has already been requested for deletion. Under the approach described in the present disclosure, by ingesting only the allocated (or non-deleted) data blocks that have been changed in between backups, the data management system may significantly reduce inbound (e.g., data ingestion) and outbound (e.g., data export) network traffic, and improve system performance by saving storage space and reducing data backup time, thereby improving the efficiency of data backup, export, and recovery.

In various embodiments, upon identifying the allocated blocks from the set of changed data blocks, the processor may send a request, via an API (e.g., VMware VixDiskLib API), to the hypervisor (e.g., hypervisor 208) of the virtual machine (e.g., virtual machine 220) to ingest the identified blocks (e.g., blocks 606). Upon receiving such a request, the hypervisor may cause the virtual machine to transmit the identified allocated blocks via a network.

At operation 412, the processor stores the one or more allocated data blocks (e.g., blocks 606) to a storage device for downstream data backup and recovery operations, as described herein. In various embodiments, the processor may store the allocated data blocks in disk 116 within server 200, disk 126 within storage appliance 300, storage device 108, or storage appliance 102, as illustrated in FIG. 1.

Figure 5:
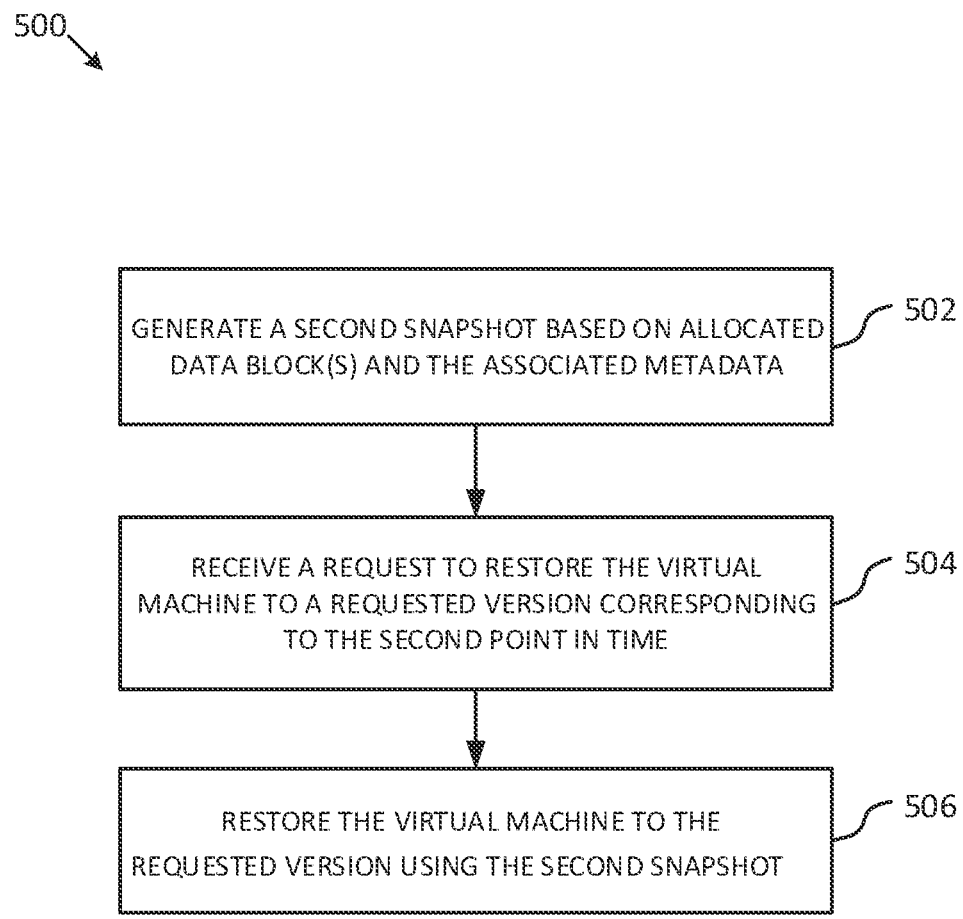
FIG. 5 depicts a block diagram illustrating example data backup and recovery operations in a method, according to some embodiments.

FIG. 5 depicts a block diagram illustrating example data backup and recovery operations in a method 500, according to some embodiments. The operations of process in method 500 may be performed by any number of different systems, such as the data management system 302 as described herein, or any component thereof, such as a processor included in any of the systems. In various embodiments, the data management system 302 may reside within server 200, as illustrated in FIG. 1 and FIG. 2. In some other embodiments, the data management system 302 may reside in both server 200 and the storage appliance 300, in which case the data management system 302 may comprise a server module (not shown) within the server 200, and a storage appliance module (not shown) within the storage appliance 300. The server module and the storage appliance module communicate with each other to facilitate data backup and recovery operations, and other operations as described herein. Each step of the example method 500 as described herein may be implemented by either or both of the server module and the storage appliance module, and may occur in a different order or be performed on or by other components.

Example methods described herein may also be implemented in the form of executable instructions stored on a machine-readable medium or in the form of electronic circuitry. For instance, the operations of method 500 may be represented by executable instructions that, when executed by a processor of a computing device, cause the computing device to perform method 500. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel.

At operation 502, the processor generates a second snapshot based on one or more allocated data blocks (e.g., blocks 606) and the associated metadata. The second snapshot may be an incremental snapshot, such as a forward incremental snapshot. The second snapshot may be associated with metadata, including a number of virtual machine configuration properties, including but not limited to a number of virtual CPUs, memory, virtual disks, disk formats, and disk sizes associated with the number of virtual disks.

At operation 504, the processor receives a request to restore the virtual machine back to the version at the second point in time.

At operation 506, upon determining that the requested virtual machine version corresponds to the second snapshot, the processor causes the data management system 302 (or other components in the networked computing environment 100) to restore the virtual machine using at least the one or more allocated data blocks (e.g., blocks 606) and the associated metadata from the second snapshot.

FIG. 6 depicts a flowchart illustrating data flow 600 within an example data management system for data backup and recovery using allocated data blocks during operation, according to some embodiments. The data flow 600 may be processed by the data management system as described herein, or individual components thereof. As illustrated in FIG. 6, the data management system accesses both the changed blocks based on CBT data 602 and the allocated blocks based on block allocation status data 604, and identifies the blocks 606 in common (e.g., one or more allocated blocks) that are both changed and allocated. In various embodiments, the processor only ingests (or read) blocks 606 for downstream data backup (e.g., snapshot generation) and recovery (e.g., snapshot export and restore) operations. In various embodiments, both the CBT data and the block allocation status data may be accessed from an internal computing unit within the data management system, from a component within the networked environment 100, or from an external third-party system via API calls, as described herein.

FIG. 7 depicts an example truth table 700 implemented by an example data management system for data backup and recovery during operation, according to some embodiments. As illustrated in FIG. 7, the data management system only ingests data blocks (as illustrated in row 702) for backup and recovery purposes that are both changed and allocated, as indicated by both the CBT data and the allocation status data, as described herein. This way, the system may avoid ingesting data that is not needed, thereby reducing inbound and outbound network traffic and improving system performance by reducing workload latency.

Figure 8:
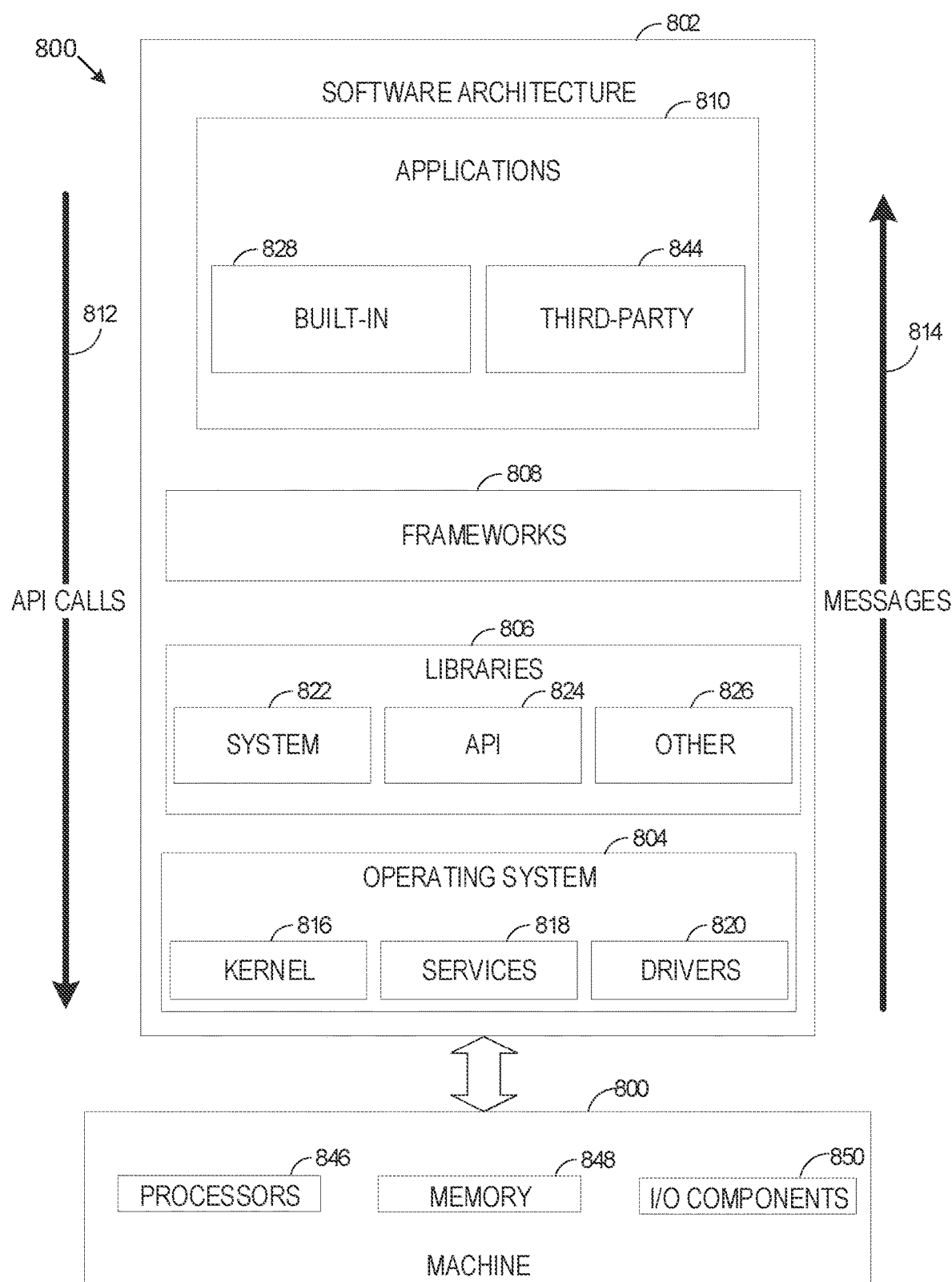
FIG. 8 depicts a block diagram illustrating an architecture of software, according to some embodiments.

FIG. 8 is a block diagram 800 illustrating an architecture of software 802, which can be installed on any one or more of the devices described above. FIG. 8 is merely a non-limiting example of a software architecture, and it will be appreciated that many other architectures can be implemented to facilitate the functionality described herein. In various embodiments, the software 802 is implemented by hardware such as a machine 900 of FIG. 9 that includes processor(s) 846, memory 848, and I/O components 850. In this example architecture, the software 802 can be conceptualized as a stack of layers where each layer may provide a particular functionality. For example, the software 802 includes layers such as an operating system 804, libraries 806, frameworks 808, and applications 810. Operationally, the applications 810 invoke API calls 812 (application programming interface) through the software stack and receive messages 814 in response to the API calls 812, consistent with some embodiments.

In various implementations, the operating system 804 manages hardware resources and provides common services. The operating system 804 includes, for example, a kernel 816, services 818, and drivers 820. The kernel 816 acts as an abstraction layer between the hardware and the other software layers, consistent with some embodiments. For example, the kernel 816 provides memory management, processor management (e.g., scheduling), component management, networking, and security settings, among other functionality. The services 818 can provide other common services for the other software layers. The drivers 820 are responsible for controlling or interfacing with the underlying hardware, according to some embodiments. For instance, the drivers 820 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 806 provide a low-level common infrastructure utilized by the applications 810. The libraries 806 can include system libraries 822 (e.g., C standard library) that can provide functions such as memory allocation functions, string manipulation functions, mathematic functions, and the like. In addition, the libraries 806 can include API libraries 824 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 806 can also include a wide variety of other libraries 826 to provide many other APIs to the applications 810.

The frameworks 808 provide a high-level common infrastructure that can be utilized by the applications 810, according to some embodiments. For example, the frameworks 808 provide various graphical user interface (GUI) functions, high-level resource management, high-level location services, and so forth. The frameworks 808 can provide a broad spectrum of other APIs that can be utilized by the applications 810, some of which may be specific to a particular operating system or platform.

In an embodiment, the applications 810 include built-in applications 828 and a broad assortment of other applications, such as a third-party application 844. The built-in applications 828 may include a home application, a contacts application, a browser application, a book reader application, a location application, a media application, a messaging application, a game application. According to some embodiments, the applications 810 are programs that execute functions defined in the programs. Various programming languages can be employed to create one or more of the applications 810, structured in a variety of manners, such as object-oriented programming languages (e.g., Objective-C, Java, or C++) or procedural programming languages (e.g., C or assembly language). In a specific example, the third-party application 844 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 844 can invoke the API calls 812 provided by the operating system 804 to facilitate functionality described herein.

Figure 9:
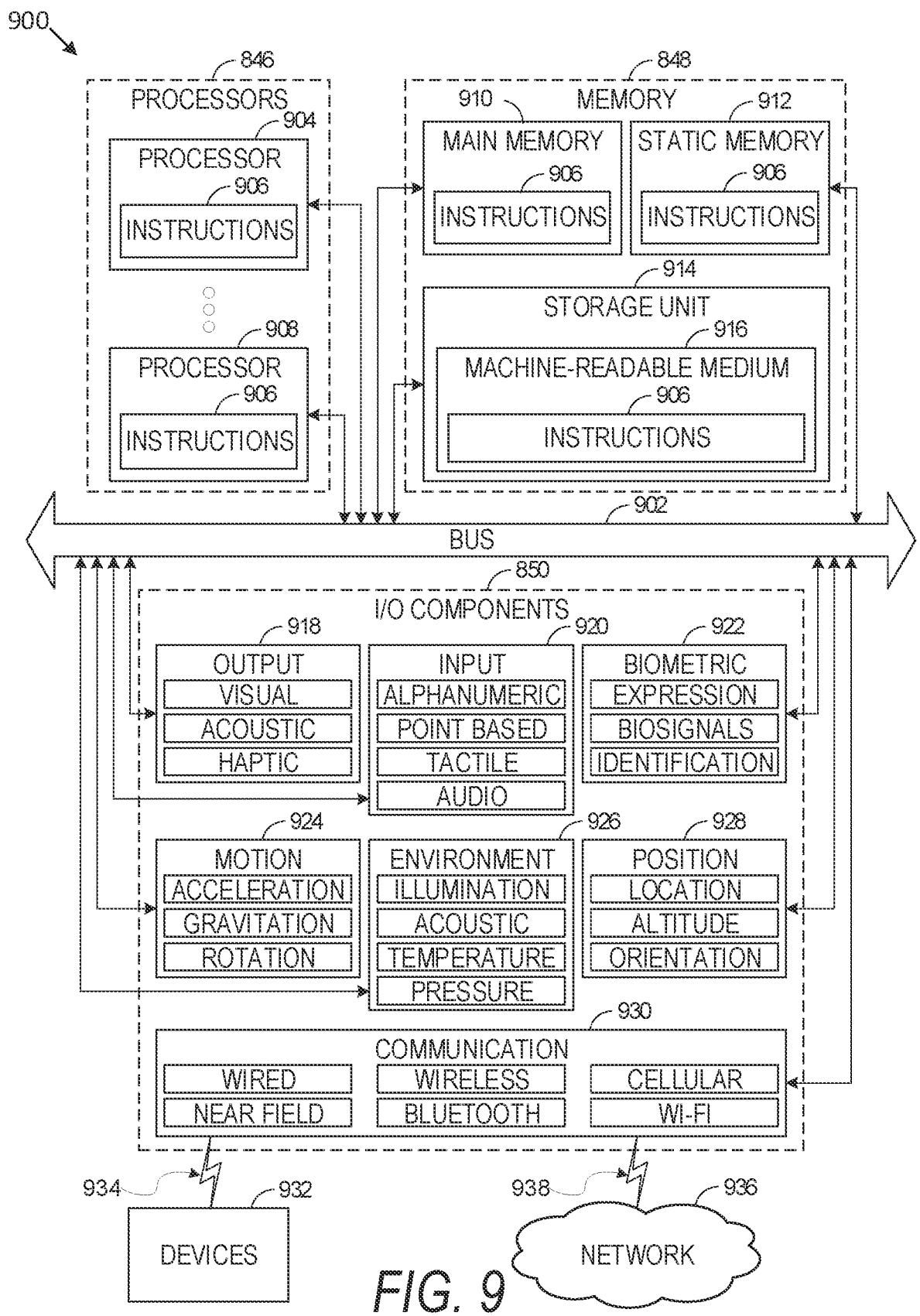
FIG. 9 illustrates a diagrammatic representation of a machine in the form of a computer system within which a set of instructions may be executed for causing a machine to perform any one or more of the methodologies discussed herein, according to some embodiments.

FIG. 9 illustrates a diagrammatic representation of a machine 900 in the form of a computer system within which a set of instructions may be executed for causing the machine to perform any one or more of the methodologies discussed herein, according to some embodiments. Specifically, FIG. 9 shows a diagrammatic representation of the machine 900 in the example form of a computer system, within which instructions 906 (e.g., software, a program, an application, an applet, an app, or other executable code) for causing the machine 900 to perform any one or more of the methodologies discussed herein may be executed. Additionally, or alternatively, the instructions 906 may implement the operations of the method shown in FIG. 5, or as elsewhere described herein.

The instructions 906 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 906, sequentially or otherwise, that specify actions to be taken by the machine 900. Further, while only a single machine 900 is illustrated, the term "machine" shall also be taken to include a collection of machines 900 that individually or jointly execute the instructions 906 to perform any one or more of the methodologies discussed herein.

The machine 900 may include processor(s) 846, memory 848, and I/O components 850, which may be configured to communicate with each other such as via a bus 902. In some embodiments, the processor(s) 846 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 904 and a processor 908 that may execute the instructions 906. The term "processor" is intended to include multi-core processors that may comprise two or more independent processors (sometimes referred to as "cores") that may execute instructions contemporaneously. Although FIG. 9 shows multiple processor(s) 846, the machine 900 may include a single processor with a single core, a single processor with multiple cores (e.g., a multi-core processor), multiple processors with a single core, multiple processors with multiples cores, or any combination thereof.

The memory 848 may include a main memory 910, a static memory 912, and a storage unit 914, each accessible to the processor(s) 846 such as via the bus 902. The main memory 910, the static memory 912, and storage unit 914 store the instructions 906 embodying any one or more of the methodologies or functions described herein. The instructions 906 may also reside, completely or partially, within the main memory 910, within the static memory 912, within the storage unit 914, within at least one of the processor(s) 846 (e.g., within the processor's cache memory), or any suitable combination thereof, during execution thereof by the machine 900.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 9. The I/O components 850 are grouped according to functionality merely for simplifying the following discussion and the grouping is in no way limiting. In some embodiments, the I/O components 850 may include output components 918 and input components 920. The output components 918 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 920 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some embodiments, the I/O components 850 may include biometric components 922, motion components 924, environmental components 926, or position components 928, among a wide array of other components. For example, the biometric components 922 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 924 may include acceleration sensor components (e.g., accelerometer), gravitation sensor components, rotation sensor components (e.g., gyroscope), and so forth. The environmental components 926 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 928 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 930 operable to couple the machine 900 to a network 936 or devices 932 via a coupling 938 and a coupling 934, respectively. For example, the communication components 930 may include a network interface component or another suitable device to interface with the network 936. In further examples, the communication components 930 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 932 may be another machine or any of a wide variety of peripheral devices (e.g., a peripheral device coupled via a USB).

Moreover, the communication components 930 may detect identifiers or include components operable to detect identifiers. For example, the communication components 930 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 930, such as location via Internet Protocol (IP) geolocation, location via Wi-Fi® signal triangulation, location via detecting an NFC beacon signal that may indicate a particular location, and so forth.

The various memories (i.e., memory 848, main memory 910, and/or static memory 912) and/or storage unit 914 may store one or more sets of instructions and data structures (e.g., software) embodying or utilized by any one or more of the methodologies or functions described herein. These instructions (e.g., the instructions 906), when executed by processor(s) 846, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In some embodiments, one or more portions of the network 936 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 936 or a portion of the network 936 may include a wireless or cellular network, and the coupling 938 may be a Code Division Multiple Access (CDMA) connection, a Global System for Mobile communications (GSM) connection, or another type of cellular or wireless coupling. In this example, the coupling 938 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 906 may be transmitted or received over the network 936 using a transmission medium via a network interface device (e.g., a network interface component included in the communication components 930) and utilizing any one of a number of well-known transfer protocols (e.g., hypertext transfer protocol (HTTP)). Similarly, the instructions 906 may be transmitted or received using a transmission medium via the coupling 934 (e.g., a peer-to-peer coupling) to the devices 932. The terms "non-transitory computer-readable storage medium," "transmission medium" and "signal medium" mean the same thing and may be used interchangeably in this disclosure. The terms "transmission medium" and "signal medium" shall be taken to include any intangible medium that is capable of storing, encoding, or carrying the instructions 906 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

The terms "machine-readable medium," "non-transitory computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

Although examples have been described with reference to some embodiments or methods, it will be evident that various modifications and changes may be made to these embodiments without departing from the broader scope of the embodiments. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This detailed description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system comprising:
a memory storing instructions; and
one or more hardware processors communicatively coupled to the memory and configured by the instructions to perform operations comprising:
identifying a first snapshot associated with a virtual machine, the first snapshot corresponding to a first point in time;
accessing, in response to a first sent request, changed block tracking data indicating one or more data changes that have occurred in the virtual machine between the first point in time and a second point in time subsequent to the first point in time;

identifying, based on the changed block tracking data, a set of changed data blocks associated with the one or more data changes;

accessing, in response to a second sent request and subsequent to accessing the changed block tracking data, block allocation status data associated with the set of changed data blocks;

identifying, based on the block allocation status data, one or more allocated data blocks from the set of changed data blocks that are also associated with an allocated status; and storing the one or more allocated data blocks to a storage device.

2. The system of claim 1, wherein the set of changed data blocks include one or more unallocated data blocks that are deleted data blocks based on a user request.

3. The system of claim 1, wherein the operations comprise:

generating a second snapshot based on the one or more allocated data blocks and associated metadata;

receiving a request to restore the virtual machine to a requested version corresponding to the second point in time; and restoring the virtual machine to the requested version using the second snapshot.

4. The system of claim 3, wherein the associated metadata include configuration properties of the virtual machine at the second point in time, including at least one of a number of virtual CPUs, memory, a number of virtual disks, or disk formats associated with the number of virtual disks.

5. The system of claim 1, wherein the virtual machine is communicatively coupled to one or more virtual disks, the one or more virtual disks including a first virtual disk associated with a disk format that allows disk space allocation on demand.

6. The system of claim 5, wherein the first virtual disk is associated with a thin provision virtual disk format.

7. The system of claim 5, wherein the first virtual disk is associated with a thick provision lazy zeroed virtual disk format.

8. The system of claim 1, wherein the virtual machine is communicatively coupled to at least one virtual disk that is associated with a thin provision virtual disk format or a thick provision lazy zeroed virtual disk format.

9. The system of claim 1, wherein the operations comprise:

sending, via a first API, the first request comprising a request to access the changed block tracking data associated with data changes occurred in the virtual machine, and the second request comprising a request to access the block allocation status data associated with the set of changed data blocks.

10. The system of claim 9, wherein the operations comprise:

upon identifying the one or more allocated data blocks from the set of changed data blocks, sending, via a second API, a request to read the one or more allocated data blocks before storing the one or more allocated data blocks to the storage device.

11. A method comprising:

identifying a first snapshot associated with a virtual machine, the first snapshot corresponding to a first point in time;

accessing, in response to a first sent request, changed block tracking data indicating one or more data changes that have occurred in the virtual machine between the first point in time and a second point in time subsequent to the first point in time;

identifying, based on the changed block tracking data, a set of changed data blocks associated with the one or more data changes;

accessing, in response to a second sent request and subsequent to accessing the changed block tracking data, block allocation status data associated with the set of changed data blocks;

identifying, based on the block allocation status data, one or more allocated data blocks from the set of changed data blocks that are also associated with an allocated status; and storing the one or more allocated data blocks to a storage device.

12. The method of claim 11, wherein the set of changed data blocks include one or more unallocated data blocks that are deleted data blocks based on a user request.

13. The method of claim 11, comprising:

generating a second snapshot based on the one or more allocated data blocks and associated metadata;

receiving a request to restore the virtual machine to a requested version corresponding to the second point in time; and restoring the virtual machine to the requested version using the second snapshot.

14. The method of claim 13, wherein the associated metadata include configuration properties of the virtual machine, including at least one of a number of virtual CPUs, memory, a number of virtual disks, or disk formats associated with the number of virtual disks.

15. The method of claim 11, wherein the virtual machine is communicatively coupled to one or more virtual disks, the one or more virtual disks including a first virtual disk associated with a disk format that allows disk space allocation on demand.

16. The method of claim 15, wherein the first virtual disk is associated with a thin provision virtual disk format.

17. The method of claim 15, wherein the first virtual disk is associated with a thick provision lazy zeroed virtual disk format.

18. The method of claim 11, comprising:

sending, via a first API, the first request comprising a request to access the changed block tracking data associated with data changes occurred in the virtual machine, and the second request comprising a request to access the block allocation status data associated with the set of changed data blocks.

19. The method of claim 18, comprising:

upon identifying the one or more allocated data blocks from the set of changed data blocks, sending, via a second API, a request to read the one or more allocated data blocks before storing the one or more allocated data blocks to the storage device.

20. A non-transitory computer-readable storage medium comprising instructions that, when executed by a processing device, cause the processing device to perform operations comprising:

identifying a first snapshot associated with a virtual machine, the first snapshot corresponding to a first point in time;

accessing, in response to a first sent request, changed block tracking data indicating one or more data changes that have occurred in the virtual machine between the first point in time and a second point in time subsequent to the first point in time;

identifying, based on the changed block tracking data, a set of changed data blocks associated with the one or more data changes;

accessing, in response to a second sent request and subsequent to accessing the changed block tracking data, block allocation status data associated with the set of changed data blocks;

identifying, based on the block allocation status data, one or more allocated data blocks from the set of changed data blocks that are also associated with an allocated status; and storing the one or more allocated data blocks to a storage device.

\* \* \* \* \*